United States Patent
Herb et al.

(10) Patent No.: US 7,510,696 B2
(45) Date of Patent: Mar. 31, 2009

(54) METHOD AND APPARATUS FOR THE PRODUCTION OF HYDROGEN-RICH GAS

(75) Inventors: Blaine Edward Herb, New Tripoli, PA (US); Shoou-I Wang, Palm Desert, CA (US); Xiang-Dong Peng, Orefield, PA (US); William Carl Rooney, Macungie, PA (US); Kevin Boyle Fogash, Wescosville, PA (US); David Hon Sing Ying, Allentown, PA (US)

(73) Assignee: Air Products and Chemicals, Inc., Allentown, PA (US)

(*) Notice: Subject to any disclaimer, the term of this patent is extended or adjusted under 35 U.S.C. 154(b) by 715 days.

(21) Appl. No.: 11/122,662

(22) Filed: May 5, 2005

(65) Prior Publication Data

US 2006/0188435 A1  Aug. 24, 2006

Related U.S. Application Data (63) Continuation-in-part of application No. 11/052,253, filed on Feb. 7, 2005, now abandoned.

(51) Int. Cl.
| | |
|---|---|
| *C01B 3/26* | (2006.01) |
| *C01B 3/12* | (2006.01) |
| *C01B 3/16* | (2006.01) |
| *C01B 3/18* | (2006.01) |
| *B01J 8/04* | (2006.01) |
| *B01J 10/00* | (2006.01) |
| *B01D 50/00* | (2006.01) |
| *B01D 53/34* | (2006.01) |

(52) U.S. Cl. ............... 423/651; 423/650; 423/655; 423/656; 422/188; 422/168; 422/182

(58) Field of Classification Search ............... 423/644, 423/650, 651, 655, 656; 422/149, 168, 182, 422/188
See application file for complete search history.

(56) References Cited

U.S. PATENT DOCUMENTS 3,595,619 A * 7/1971 Slater et al. ............. 423/656

(Continued)

FOREIGN PATENT DOCUMENTS

WO    03/085767    10/2003

(Continued)

OTHER PUBLICATIONS

Haeussinger P, et al; "Hydrogen"; Ullmann's Encyclopedia of Industrial Chemistry. High Performance Fibers to Imidazole and Derivatives; Weinheim, VCH Verlag, DE; vol. A13; 1989; pp. 297-441; XP001109477.

(Continued)

*Primary Examiner*—Karl E Group
*Assistant Examiner*—Noah S Wiese
(74) *Attorney, Agent, or Firm*—Bryan C. Hoke, Jr.

(57) ABSTRACT

A method and apparatus for the production of hydrogen-rich gas are provided. The method and apparatus prevent over-reduction of iron oxide-based shift catalyst by introducing an oxidative stream along with a carbon monoxide containing gaseous feed stream from a catalytic steam reformer to the catalyst bed region and thereby limits structural deterioration of the catalyst. Various sources may provide the oxidative stream including a shift catalyst bed region and a selective oxidation catalyst region.

18 Claims, 7 Drawing Sheets

U.S. PATENT DOCUMENTS

| | | | |
|---|---|---|---|
| 4,152,407 A | | 5/1979 | Fuchs |
| 4,341,737 A | | 7/1982 | Albano et al. |
| 4,423,022 A | * | 12/1983 | Albano et al. ............... 423/360 |
| 4,553,981 A | | 11/1985 | Fuderer |
| 5,030,440 A | | 7/1991 | Lywood et al. |
| 5,110,559 A | | 5/1992 | Kondo et al. |
| 6,500,403 B2 | | 12/2002 | Ward |
| 6,524,550 B1 | * | 2/2003 | Chintawar et al. .......... 423/650 |
| 6,667,123 B2 | * | 12/2003 | Yu .............................. 429/17 |
| 6,972,119 B2 | * | 12/2005 | Taguchi et al. .............. 422/188 |

FOREIGN PATENT DOCUMENTS

| | | |
|---|---|---|
| WO | 2004/062764 | 7/2004 |
| WO | WO 2004/062764 | 7/2004 |

OTHER PUBLICATIONS

Cromarty B J, et al; "Increasing the Throughput of an Existing Hydrogen Plant"; International Journal of Hydrogen Energy, Elsevier Science Publishers B.V.; Barking, GB; vol. 22, No. 1; Jan. 1997; pp. 17-22; XP004015117.

Joensen F, et al; "Conversion of Hydrocarbons and Alcohols for Fuel Cells"; Journal of Power Sources; Elsevier, Amsterdam, NL; vol. 105, No. 2; Mar. 20, 2002; pp. 195-201; XP004376852.

* cited by examiner

METHOD AND APPARATUS FOR THE PRODUCTION OF HYDROGEN-RICH GAS

CROSS-REFERENCE TO RELATED APPLICATIONS

This application is a continuation-in-part of application Ser. No. 11/052,253 filed on Feb. 7, 2005 now abandoned.

STATEMENT REGARDING FEDERALLY SPONSORED RESEARCH OR DEVELOPMENT

None.

BACKGROUND OF THE INVENTION

This invention relates to a continuous process for the production of hydrogen-rich gas. More specifically, the present invention pertains to a method and apparatus for preventing over-reduction of iron oxide-based shift catalyst thereby limiting structural deterioration of the catalyst.

Hydrogen gas may be obtained by the catalytic reaction of carbon monoxide and steam. This reaction is exothermic and is commonly referred to as the water-gas shift reaction or shift reaction: $CO+H_2O \rightarrow CO_2+H_2$. The reaction is affected by passing carbon monoxide and water through a bed of a suitable catalyst. The feed gas containing carbon monoxide and water may originate from a steam methane reformer (SMR), autothermal reformer (ATR), partial oxidation (POX) reactor, catalytic partial oxidation (CPO) reactor, coal or other solid feed stock gasifier, or other suitable device known in the art.

A typical conventional water-gas shift catalyst is an iron oxide promoted by chromium oxide ($CrO_2$). The general class of oxides of iron will be referred to herein as iron oxide. This catalyst is referred to commonly as a high temperature shift catalyst because it starts to become active at temperatures in the range of about 600 to 710° F., whereas other shift reaction promoting catalysts operate at lower temperatures. The effluent gas stream leaving a reaction zone containing high temperature shift catalyst is at a temperature in the range of about 715 to 1000° F.

Chromium oxide promoted iron oxide-based shift catalyst is relatively low priced, readily available, and its strength is high at the high temperatures which exist at the exit of the catalyst bed. However, a serious disadvantage is that the reaction rate of iron oxide catalysts at low temperatures is comparatively slow. Accordingly, the inlet temperature of the reactants must be at a minimum of about 600° F.

Limitations of HTS catalyst include high temperature and over-reduction, depending on the feed to the HTS reactor, which is normally the syngas stream produced in a hydrogen/sygas production stage. The hydrogen/syngas production stage is where the carbon containing feedstock is converted into hydrogen/syngas by SMR, ATR, POX reactor, CPO reactor, coal or other solid feed stock gasifier, or other suitable device known in the art. The hydrogen/syngas production stage is generally operated at a pressure in the range 5 to 50 bar abs., and normally in the range 10 to 40 bar abs. The temperature at which the hydrogen/syngas production stage is affected will normally be in the range 700 to 1200° C., particularly 750 to 1100° C.

The temperature rise across the shift reactor is generally a limitation affecting steam consumption in partial oxidation (POX) and gasification-based hydrogen production processes. The CO content in the syngas from a POX unit or a gasification unit is high, typically greater than 40 volume %. The water gas shift reaction is used to convert CO, in the presence of $H_2O$, to the desired product $H_2$ and byproduct $CO_2$, which is removed by a downstream separation process. Since the shift reaction is exothermic, conversion of large amounts of CO in the syngas from a POX unit or a gasification unit releases a large amount of heat, causing large temperature rise across the shift reactor, which leads to catalyst deactivation by sintering.

A conventional method for overcoming this temperature issue in the POX- or gasification-based hydrogen process is to use a series of stages of adiabatic shift reactors with inter-stage cooling, either by heat exchangers or direct quench using liquid water (cf U.S. Pat. Nos. 3,595,619 and 6,409,974). The steam requirement in the shift feed is relatively high (e.g., steam-to-dry gas volume ratio of about 2). The sensible heat of the excess steam is needed to moderate the temperature rise across the shift reactor. This excess use of steam, however, reduces the the thermal efficiency of the process. Rao et al. (PCT application US2004/000926) suggest a configuration and method to address the temperature issue for POX- and gasification-based hydrogen processes.

In contrast, the temperature rise across the shift reactor is small in a catalytic steam reformer-based hydrogen production processes because of lower CO content (e.g. typically less than 10 vol. %) and high $H_2$ content (e.g. typically about 50 vol. %) in the syngas. Accordingly, the temperature rise can be tolerated by a simple one-stage, adiabatic shift reactor. In the conventional catalytic steam reforming process, the steam-to-dry gas ratio in a HTS reactor feed is typically around 0.5, which is much smaller than that in the POX- or gasification-based processes (e.g. steam-to-dry gas volume ratio of about 2). For catalytic steam reforming, the steam-to-dry gas ratio is generally set by the HTS catalyst over-reduction limit, not the temperature rise across the shift reactor.

The HTS catalyst comes from the supplier as hematite ($Fe_2O_3$) and is reduced in situ to the active magnetite state ($Fe_3O_4$). If the catalyst is reduced further to wustite (FeO) or completely to iron metal ($Fe°$), its strength will decrease to a point where it begins to lose its physical integrity. A further problem with over-reduction is that both wustite and iron metal can catalyze the Fischer-Tropsch reaction. This has two effects: first, there is a decrease in hydrogen production and second, there is an increase in undesirable byproducts, both paraffins and higher alcohols and amines.

The key to maintaining the catalyst in the proper state for the water-gas shift reaction, but not the Fischer-Tropsch reaction is to control the reducing/oxidizing potential of the feed gas such that the catalyst remains in the magnetite state and not the wustite or metallic iron state. The feed gas entering the high temperature shift reactor has four constituents that affect this balance, CO, $CO_2$, $H_2$ and $H_2O$. The hydrogen and carbon monoxide will reduce the iron, while the carbon dioxide and steam will oxidize it.

Control of the relative concentrations of CO, $CO_2$, $H_2$ and $H_2O$ is difficult for all sources of feed gas to the shift reactor. For example, for feed gas from a catalytic steam reformer, measurement is difficult and the actual composition depends on many variables such as the reforming temperature and pressure and the ratio of hydrogen to carbon to oxygen atoms in the feed gas to the reformer. The latter in turn depends on the hydrocarbon feedstock and the steam-to-carbon ratio to the reformer. The steam-to-carbon ratio (S/C ratio) is defined as the (overall) ratio of the moles of steam to moles of carbon atoms in the hydrocarbons in the feed(s) to the reformer. Additionally, it is hard to know what the limits to prevent over-reduction actually are since the catalyst damage (over-reduction) comes before the symptoms (byproduct formation and increased pressure drop).

Historically, many plants have operated at conditions where the over-reduction of high temperature shift (HTS) catalyst was not an issue. Through the 1970s and into the early 1980s, hydrogen and ammonia plants operated at steam-to-carbon (S/C) ratios of 3.5 and above. Under these conditions, the HTS catalyst remained in the proper state and over reduction of the catalyst was not an issue. Many of these plants needed the steam for reboiler duty in the acid gas removal system. As more PSA based hydrogen plants were designed and more efficient acid gas removal processes for ammonia plants were developed and introduced to the marketplace, the need for low level heat decreased and operators started reducing the S/C ratio to the reformer for economic reasons. As the S/C ratio declined, catalyst manufacturers and operators struggled to define the acceptable operating range of S/C ratio for the high temperature shift.

The carbon monoxide to carbon dioxide molar ratio and the proportion of steam in the feed to the HTS reactor will depend on the conditions employed in the hydrogen/syngas production stage. In the catalytic steam reforming case, increasing the outlet temperature of the reformer, increasing the pressure, and/or decreasing the steam to feedstock carbon ratio (steam-to-carbon ratio) in the reformer feed, all tend to increase the risk of over-reduction of the shift catalyst in the subsequent shift reactor stage.

Generally to minimize risk of over reduction of shift catalyst in a subsequent high temperature shift stage employing an iron oxide catalyst, it has generally been necessary to employ a gas mixture containing a substantial amount of steam (so that the steam to dry gas molar ratio is greater than about 0.5, or greater than 0.6) and/or to employ hydrogen/syngas production conditions such that the molar ratio of carbon monoxide to carbon dioxide in the gas stream is limited to no more than about 1.9, or no more than 1.8, or no more than 1.7.

Where the hydrogen/syngas production process involves catalytic steam reforming, it is possible to operate with a sufficient excess of steam that such problems are avoided. However the generation of such an excess of steam is not energy efficient and, in the interests of economy, it is desirable to operate steam reforming processes at low steam-to-carbon ratios. In fact, the quest to improve the overall economics of catalytic steam reformer produced $H_2$ has already driven the steam-to-carbon ratio below the point where the syngas produced by the catalytic steam reformer is able to maintain the HTS catalyst in the proper oxidation state. In general, the limit on the steam-to-carbon ratio to a catalytic steam reformer below which an HTS catalyst in the shift reactor will become over-reduced by catalytic steam reformer syngas is approximately 2.8. Today, catalytic steam reformer designs may be developed for steam-to-carbon ratios of 2.5 and lower so that the traditional HTS shift reactor can no longer be used without damage to the catalyst.

It is possible to adjust the composition into the HTS reactor by operating the catalytic steam reformer at low steam-to-carbon ratio (i.e. S/C=2.5) and then adding steam to the catalytic steam reformer syngas immediately upstream of the HTS reactor in order to adjust the HTS inlet composition to prevent over-reduction of the HTS catalyst. Unfortunately, the economic benefits that were achieved by lowering the steam-to-carbon ratio into the catalytic steam reformer process are essentially cancelled out due to the efficiency penalty associated with the added steam injected upstream of the HTS reactor. The overall steam-to-carbon ratio (including steam to catalytic steam reformer plus added steam injection to HTS reactor) required to protect the HTS catalyst from overreduction is approximately 2.8.

Alternatively, a different catalyst may be used that is not damaged by the more reducing stream from a catalytic steam reformer operating with a steam-to-carbon ratio less than 2.8.

The current invention solves the problem of over-reduction of iron oxide based shift catalyst.

Related disclosures include U.S. Pat. Nos. 3,595,619, 4,152,407, 4,341,737, 4,861,745, 4,423,022, 5,030,440, and 6,500,403, and PCT application US2004/000926.

BRIEF SUMMARY OF THE INVENTION

In the present invention, the risk of over-reduction of iron oxide-based shift catalyst resulting in structural deterioration of the catalyst may be avoided by directly or indirectly adding an oxidative stream to a gaseous feed stream to the shift reactor and/or to provide at least two gaseous feed streams to at least two regions of shift catalyst, thereby maintaining criteria for preventing over-reduction of the shift catalyst.

Accordingly the present invention relates to a method for producing hydrogen rich gas comprising producing synthesis gas in a catalytic steam reformer, withdrawing an effluent stream comprising the synthesis gas from the catalytic steam reformer, introducing a gaseous stream comprising at least a portion of the catalytic steam reformer effluent stream into a shift catalyst region, introducing an oxidative stream comprising $CO_2$ either directly or indirectly with the gaseous stream to the shift catalyst region wherein the oxidative stream is derived from at least one of a side stream from the shift reactor, a product stream of the shift reactor preferably after cooling in a heat exchanger, a side stream or product stream from another shift reactor, enriched $CO_2$ streams from $CO_2$ separation units, a combustion reactor effluent stream, a selective oxidation reactor effluent stream, hydrogen pressure swing adsorption purge gas streams, a hydrogen pressure swing adsorption feed gas stream, and other $CO_2$-rich streams from the hydrogen plant, a refinery, a chemical plant, or other nearby process, reacting CO and $H_2O$ in the shift catalyst region to produce additional $H_2$ and $CO_2$ thereby forming a product stream, and withdrawing the product stream from the shift catalyst region.

In another embodiment, the present invention relates to a method for producing hydrogen-rich gas comprising producing synthesis gas in a catalytic steam reformer, withdrawing an effluent stream comprising the synthesis gas from the catalytic steam reformer, directly or indirectly introducing a first gaseous stream comprising the catalytic steam reformer effluent stream into a first region of shift catalyst, directly or indirectly introducing a second gaseous stream comprising CO and optionally $H_2O$, $H_2$, or $CO_2$, into a second region of shift catalyst, directly or indirectly introducing an oxidative stream comprising at least one of $H_2O$ and $CO_2$ to the second region of shift catalyst, reacting CO and $H_2O$ in the second region of shift catalyst to produce additional $H_2$ and $CO_2$ thereby forming a second region product stream, directly or indirectly introducing at least a portion of the second region product stream into the first region of shift catalyst, reacting CO and $H_2O$ in the first region of shift catalyst to produce additional $H_2$ and $CO_2$ thereby forming a first region product stream, and withdrawing the first region product stream from the first region of shift catalyst.

The present invention also relates to an apparatus for producing hydrogen-rich gas comprising a first shift catalyst region, a gaseous stream source comprising a catalytic steam reformer for providing a gaseous stream comprising CO and optionally H$_2$O in fluid communication with an inlet of the first shift catalyst region, and at least one of a second shift catalyst region and a selective oxidation catalyst region, wherein at least one of an outlet from the second shift catalyst region and an outlet from the selective oxidation catalyst region is in fluid communication with an inlet of the first shift catalyst region.

Prior art fails to teach a method including production of synthesis gas in a catalytic steam reformer coupled with the addition of an oxidative stream to the feed stream comprising synthesis gas to a shift reactor wherein the oxidative stream is derived from at least one of a side stream from the shift reactor, a product stream of the shift reactor after cooling in a heat exchanger, a side stream or product stream from another shift reactor, pure or enriched CO$_2$ streams from CO$_2$ separation units, a combustion reactor effluent stream, a selective oxidation reactor effluent stream, hydrogen pressure swing adsorption purge gas streams, a hydrogen pressure swing adsorption feed gas stream, and other CO$_2$-rich streams from the hydrogen plant, a refinery, a chemical plant, or other nearby process so as to prevent over-reduction of iron oxide-based shift catalyst, thereby limiting structural deterioration of the catalyst.

Prior art fails to teach a method including multiple shift catalyst regions where a gaseous feed stream derived from a catalytic steam reformer is introduced to a downstream shift catalyst region and an oxidative stream comprising at least one of H$_2$O and CO$_2$ and gaseous feed stream comprising CO and optionally H$_2$O are introduced to an upstream shift catalyst region.

Prior art fails to teach an apparatus comprising a catalytic steam reformer in combination with multiple shift catalyst regions where effluent from the catalytic steam reformer provides gaseous feed streams to each of the multiple shift catalyst regions.

BRIEF DESCRIPTION OF SEVERAL VIEWS OF THE DRAWINGS

Referring to the drawings, typical arrangements of application relating to the present invention to a shift reaction are illustrated. Like reference numbers refer to like elements throughout the several views.

DETAILED DESCRIPTION OF THE INVENTION

Generally, the inlet feed gas temperature for a high temperature shift reaction is in the range 550 to 750° F. (288 to 399° C.) and typically an iron oxide-based catalyst is used. For a medium temperature shift reaction, the inlet feed gas temperature is generally about 400 to 600° F. (204 to 316° C.) and for a low temperature shift reaction, the inlet feed gas temperature is generally about 350 to 450° F. (177 to 232° C.). For both the medium temperature shift and low temperature shift, a copper-based catalyst is typically used. A shift catalyst is a catalyst that affects the water gas shift reaction.

Figure 1:
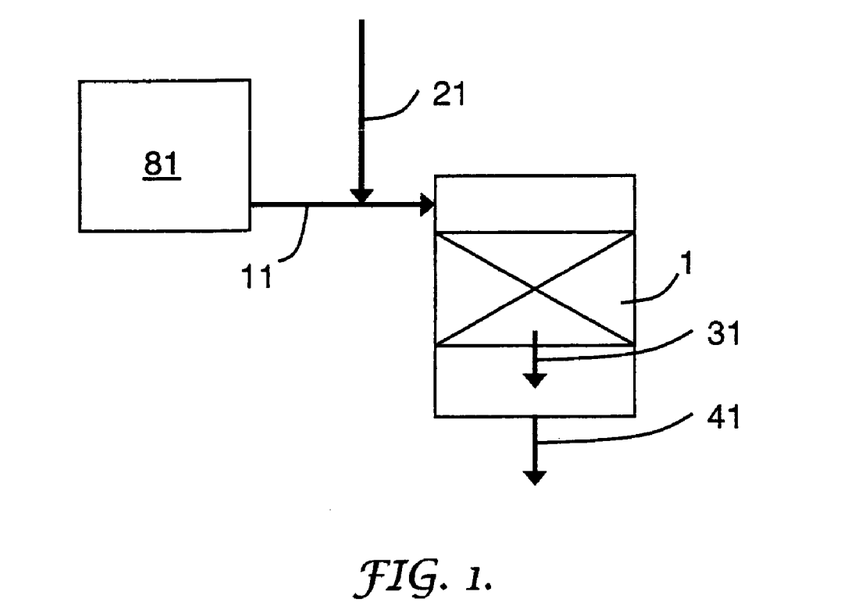
FIG. 1 is a schematic of an embodiment of the current invention with a catalytic steam reformer and one region of shift catalyst. Feed and oxidative streams are premixed.

Referring now to FIG. 1, illustrating one embodiment of the current invention, a shift reactor is provided having a first shift catalyst region 1 containing high temperature shift catalyst. The shift catalyst may be a CrO$_2$ promoted Fe$_2$O$_3$ shift catalyst. A first gaseous stream 11, comprising syngas from a catalytic steam reformer 81 is introduced to the first shift catalyst region 1. The catalytic steam reformer 81 may be operated with a steam-to-carbon ratio of 1.7 to 2.8, or 2.2 to 2.7. As a result of operating the reformer within these steam-to-carbon ratios, the CO/CO2 ratio may be greater than 1.61, or greater than 1.75, or greater than 1.9. A first oxidative stream 21 comprising CO$_2$ is mixed with the first gaseous stream 11 prior to introducing to the first shift catalyst region 1. The molar ratio of the first oxidative stream 21 to the first gaseous stream 11 may be 0.0001 to 0.8, or may be 0.0005 to 0.2 or may be 0.0005 to 0.1. Oxidative stream sources may include effluent from a second shift reactor, enriched CO$_2$ streams from CO$_2$ separation units, effluent streams from a combustion process, selective oxidation reactor effluent streams, hydrogen pressure swing adsorption purge gas streams, hydrogen pressure swing adsorption feed gas streams, and other CO$_2$-rich streams from the hydrogen plant, a refinery, a chemical plant, or other nearby process.

A reducing stream is defined as a stream with a composition that will reduce the shift catalyst from its working state to a lower oxidation state.

An oxidative stream is defined as a stream that can be combined with a reducing stream to result in a stream that will not reduce the shift catalyst from its working state to a lower oxidation state.

As defined herein, an enriched CO$_2$ stream may include a pure CO$_2$ stream. A CO$_2$-rich stream may include a pure CO$_2$ stream.

An effluent stream is any outgoing stream. Side streams and final product streams are both effluent streams.

A nearby process is defined as a process that can be connected by pipes.

Catalytic steam reforming, also called steam methane reforming (SMR) or steam reforming, is defined as any process used to convert hydrocarbon feeds to synthesis gas by reaction with steam over a catalyst. Synthesis gas, commonly called syngas, is a mixture comprising hydrogen and carbon monoxide.

A catalytic steam reformer, also called a steam methane reformer, is defined as any apparatus used to convert hydrocarbon feeds to synthesis gas by reaction with steam over a catalyst.

A combustion process is defined as any process, such as a furnace process, that reacts carbonaceous fuel and oxidant to produce $CO_2$ and other gases.

A selective oxidation reactor is defined as a device having a catalyst, such as Selectoxo™ catalyst sold by Engelhard Corporation, for selective oxidation of CO in $H_2$ to produce $CO_2$ and other gases.

Figure 2:
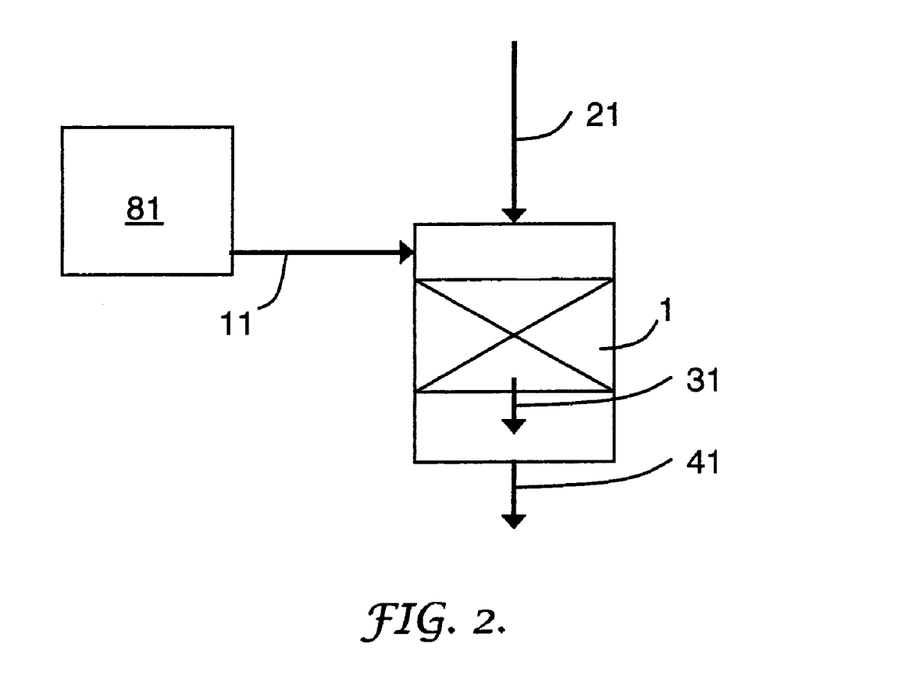
FIG. 2 is a schematic of an embodiment of the current invention with a catalytic steam reformer and one region of shift catalyst where feed and oxidative streams are introduced separately to the shift catalyst region.

In the embodiment shown in FIG. 1, the first gaseous stream 11 and the first oxidative stream 21 are introduced indirectly, i.e. after mixing. In an alternative embodiment, shown in FIG. 2, the first oxidative stream 21 may be introduced directly to the first shift catalyst region 1 separate from the first gaseous stream 11. Introducing a stream directly to a shift catalyst region means that the stream is not mixed with another stream prior to the introduction as in FIG. 2. Introducing a stream indirectly to a shift catalyst region means that the stream is mixed with another stream prior to the introduction as in FIG. 1. A separate mixing device (not shown) may be included to affect thorough mixing of the streams. In FIG. 2, first gaseous stream 11, comprising syngas from a catalytic steam reformer 81 is introduced to the first shift catalyst region 1 separately from the first oxidative stream 21. The catalytic steam reformer 81 may be operated with a steam-to-carbon ratio of 1.7 to 2.8, or 2.2 to 2.7.

In the first shift catalyst region 1 of FIGS. 1 and 2, CO and $H_2O$ are reacted in the presence of the shift catalyst to produce additional $H_2$ and $CO_2$, thereby forming a first region product stream 31. The first region product stream 31 is removed from the shift reactor as product stream 41.

Figure 3:
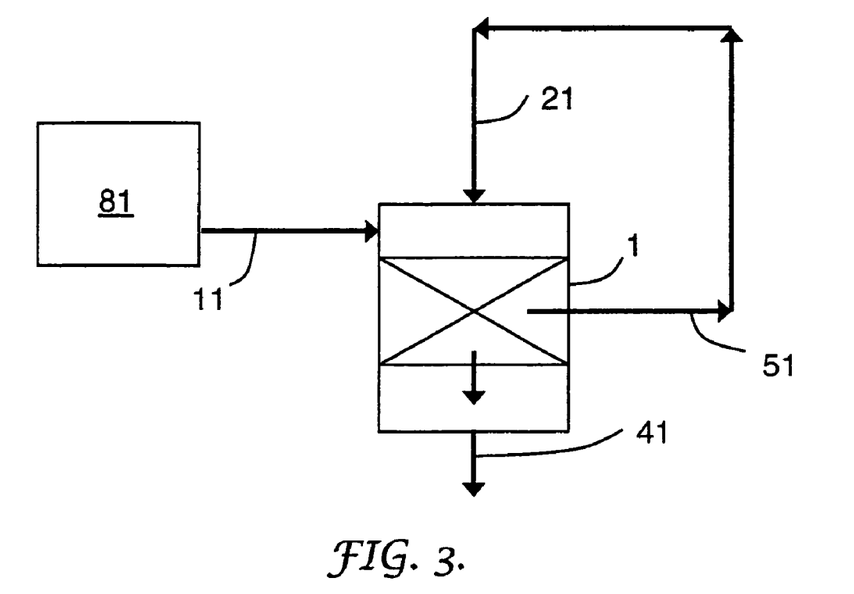
FIG. 3 is a schematic of an embodiment of the current invention with one region of shift catalyst where a side stream from the shift reactor forms an oxidative stream.

Alternatively, an oxidative stream 21 may be derived from the final product stream of the shift reactor after, for example, cooling in a heat exchanger, or intermediate effluent streams. The intermediate effluent stream may be any side stream and may be taken from the end of a catalyst region 1 or from within the catalyst region 1 as depicted in FIG. 3 by stream 51. A side stream is defined as a stream withdrawn from any catalyst region that has been affected by the shift reaction, but not including the final product stream 41 of the shift reactor. A side stream may be derived from any location downstream of a gaseous feed stream 11 provided additional $H_2$ and $CO_2$ has been produced as compared to the feed stream thereby making it more oxidative than the gaseous feed stream. The side stream may be injected unmodified or after cooling in a heat exchanger (not shown). In FIG. 3, gaseous stream 11 comprises syngas from a catalytic steam reformer 81. The catalytic steam reformer 81 may be operated with a steam-to-carbon ratio of 1.7 to 2.8, or 2.2 to 2.7.

Figure 4:
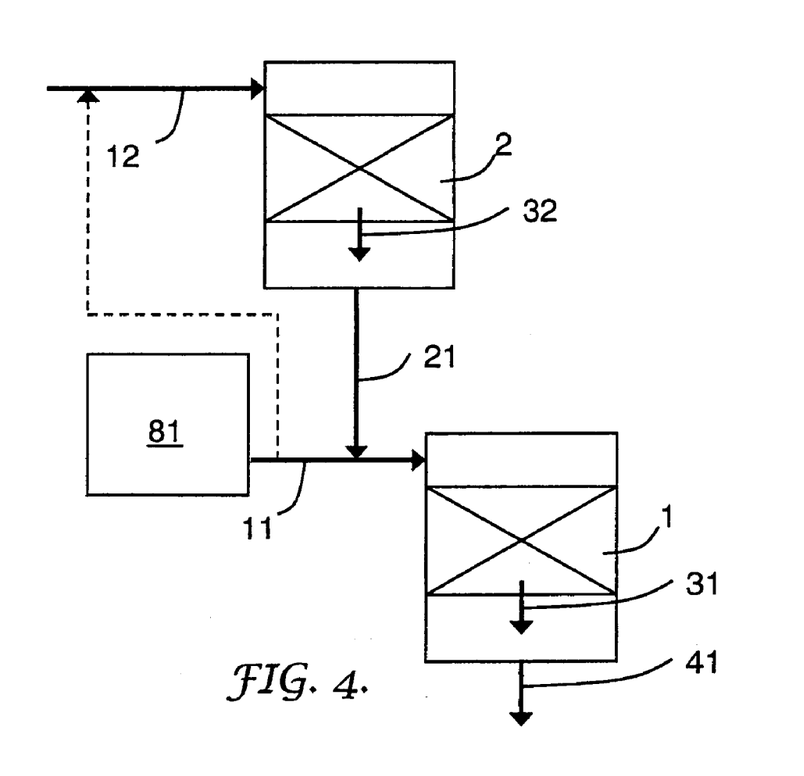
FIG. 4 is a schematic of an embodiment of the current invention with a region of high temperature shift catalyst and a region of low or medium temperature shift catalyst where the effluent from the low or medium temperature shift catalyst region forms an oxidative stream for the high temperature shift catalyst region.

FIG. 4 shows another embodiment of the invention. A high temperature shift catalyst region 1 is provided. A first gaseous stream 11 comprising syngas from a catalytic steam reformer 81 is introduced to the first shift catalyst region 1. The catalytic steam reformer 81 may be operated with a steam-to-carbon ratio of 1.7 to 2.8, or 2.2 to 2.7. A first oxidative stream 21 comprising $CO_2$ is mixed with the first gaseous stream 11 prior to introducing to the first shift catalyst region 1. The first gaseous stream 11 and the first oxidative stream 21 are introduced indirectly, i.e. after mixing in this figure. Alternatively, the first oxidative stream 21 may be introduced directly to the first shift catalyst region 1 separate from the first gaseous stream 11. In this embodiment, the first oxidative stream is derived from effluent from a second shift reactor where the second shift reactor may be a low temperature shift or medium temperature shift reactor. A second gaseous stream 12 comprising CO and optionally $H_2O$ is introduced to a second shift catalyst region 2 where additional $CO_2$ is formed, thereby forming a second shift catalyst region product stream 32, which is used as the first oxidative stream 21. First gaseous stream 11 and second gaseous stream 12 may be from the same source, i.e. the catalytic steam reformer 81, but this is not required. For example, the second gaseous stream 12 may be from an ATR, POX, or gasifier. The first oxidative stream 21 may be derived in whole or in part from the second shift catalyst region product stream 32. In the first shift catalyst region 1, CO and $H_2O$ are reacted in the presence of the shift catalyst to produce additional $H_2$ and $CO_2$, thereby forming a first region product stream 31. The first region product stream 31 is removed from the shift reactor as product stream 41.

Figure 5:
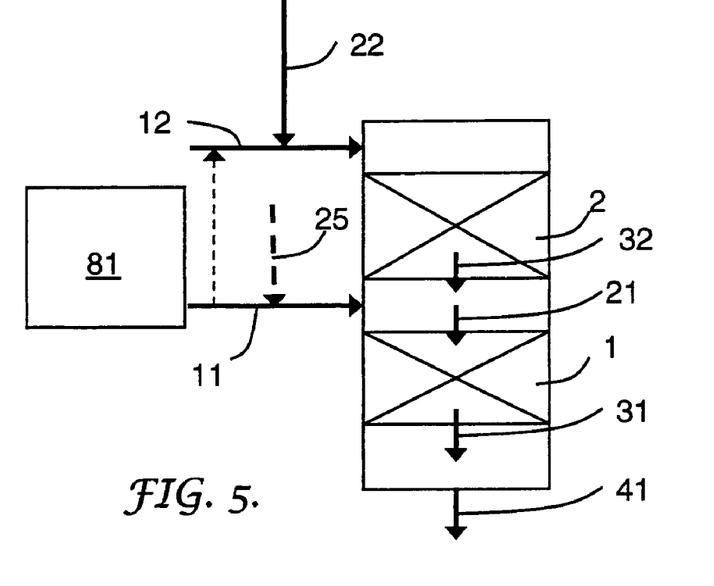
FIG. 5 is a schematic of an embodiment of the current invention with two regions of shift catalyst and premixed feed and oxidative streams to the upstream region and optionally premixed feed and oxidative streams to the downstream region.

Referring now to FIG. 5, illustrating another embodiment of the current invention, a shift reactor is provided having a first shift catalyst region 1 and a second shift catalyst region 2. In this embodiment the first shift catalyst region 1 and the second shift catalyst region 2 may both contain high temperature shift catalyst. The shift catalyst may be a $CrO_2$ promoted $Fe_2O_3$ shift catalyst. A first gaseous stream 11, comprising syngas from a catalytic steam reformer 81 is introduced to the first shift catalyst region 1. The catalytic steam reformer 81 may be operated with a steam-to-carbon ratio of 1.7 to 2.8 or 2.2 to 2.7. A first oxidative stream 21 comprising $CO_2$ is mixed with the first gaseous stream 11 prior to introducing to the first shift catalyst region 1. The first gaseous stream 11 and the first oxidative stream 21 are introduced indirectly, i.e. after mixing in this figure. Alternatively, the first oxidative stream 21 may be introduced directly to the first shift catalyst region 1 separate from the first gaseous stream 11. The molar ratio of the first oxidative stream 21 to the first gaseous stream 11 may be 0.0001 to 0.8, and may be 0.0005 to 0.2.

In this embodiment shown in FIG. 5, the first oxidative stream is derived from effluent from the second shift region 2. A second gaseous stream 12, comprising CO and optionally $H_2O$, $H_2$, and $CO_2$ is introduced to the second shift catalyst region 2. First gaseous stream 11 and second gaseous stream 12 may be from the same source, i.e. the catalytic steam reformer 81, but this is not required. A second oxidative stream 22 comprising at least one of $H_2O$ (steam) and carbon dioxide is mixed with the second gaseous stream 12 prior to introducing to the second shift catalyst region 2, i.e. streams 22 and 12 are introduced indirectly. Alternatively, the second oxidative stream 22 may be introduced directly to the second shift catalyst region 2 separate from the second gaseous stream 12.

In the second shift catalyst region 2, CO and $H_2O$ are reacted in the presence of the shift catalyst to produce additional $H_2$ and $CO_2$, thereby forming a second shift catalyst region product stream 32, which is used as the first oxidative stream 21. The first oxidative stream 21 may be derived in whole or in part from the second shift catalyst region product stream 32. First gaseous stream 11 and first oxidative stream 21 may be introduced directly, as shown in the figure, or indirectly. In the first shift catalyst region 1, CO and $H_2O$ are reacted in the presence of the shift catalyst to produce additional $H_2$ and $CO_2$, thereby forming a first region product stream 31. In this illustration, the first region product stream 31 is removed from the shift reactor as product stream 41.

Optionally, supplemental oxidizing stream 25 may be mixed with the first gaseous stream 11 prior to introduction to the first shift catalyst region 1. Optionally (not shown), the supplemental oxidizing stream 25 may be added to the first shift catalyst region 1, separately from the first gaseous stream 11.

For systems with multiple catalyst regions, the catalyst regions may be provided in the same vessel as depicted in FIG. 5, or in separate vessels as depicted in FIG. 4.

Figure 6:
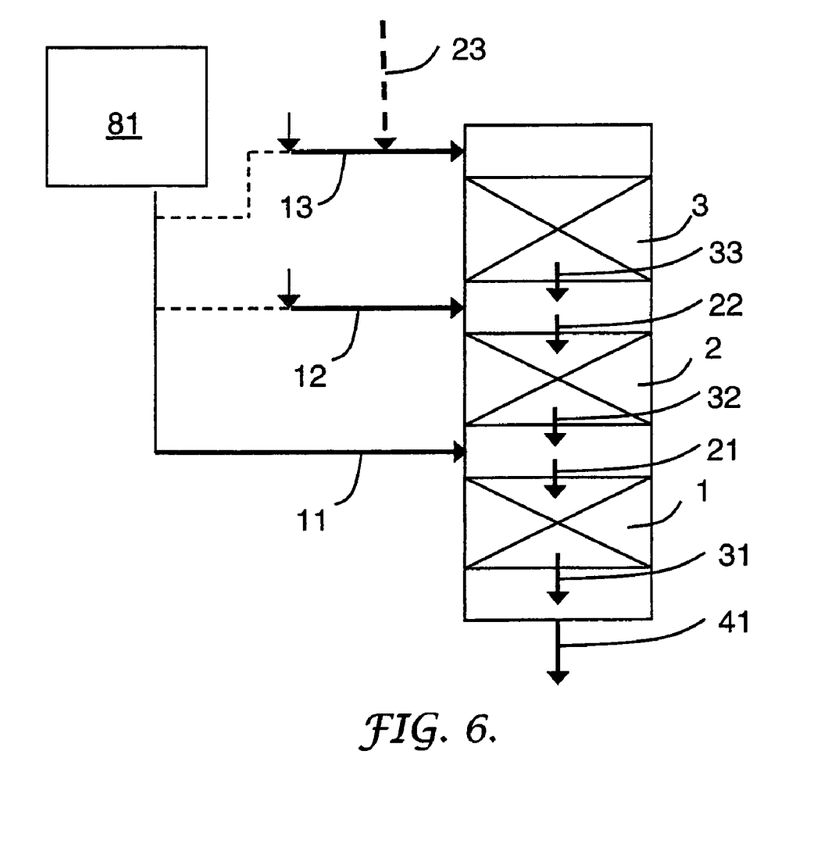
FIG. 6 is a schematic of an embodiment of the current invention with three regions of shift catalyst.

The current invention may be extended to three or more regions of shift catalyst. FIG. 6 illustrates an embodiment of the current invention having three regions of shift catalyst. The embodiment of FIG. 6 has a third shift catalyst region 3. A third gaseous stream 13 comprising CO and optionally $H_2O$, and an optional oxidative stream 23 are introduced to the third shift catalyst region 3, CO and $H_2O$ are reacted in the third catalyst region 3 to produce additional $H_2$ and $CO_2$, thereby forming a third region product stream 33 which is withdrawn from the third shift catalyst region 3 which is used as the second oxidative stream 22. The second oxidative stream 22 may be derived in whole or in part from the third shift catalyst region product stream 33. Second gaseous stream 12 and second oxidative stream 22 may be introduced directly or indirectly. In the second shift catalyst region 2, CO and $H_2O$ are reacted in the presence of the shift catalyst to produce additional $H_2$ and $CO_2$, thereby forming a second region product stream 32, which is used as the first oxidative stream 21. The first oxidative stream 21 may be derived in whole or in part from the second shift catalyst region product stream 32. First gaseous stream 11 and first oxidative stream 21 may be introduced directly or indirectly. In the first shift catalyst region 1, CO and $H_2O$ are reacted in the presence of the shift catalyst to produce additional $H_2$ and $CO_2$, thereby forming a first region product stream 31. The first region product stream 31 is removed from the shift reactor as product stream 41. First gaseous stream 11 comprising syngas from catalytic steam reformer 81 is introduced to the first shift catalyst region 1. The catalytic steam reformer 81 may be operated with a steam-to-carbon ratio of 1.7 to 2.8 or 2.2 to 2.7. First gaseous stream 11, second gaseous stream 12, and third gaseous stream 13 may be from the same source, i.e. the catalytic steam reformer 81, but this is not required.

Figure 7:
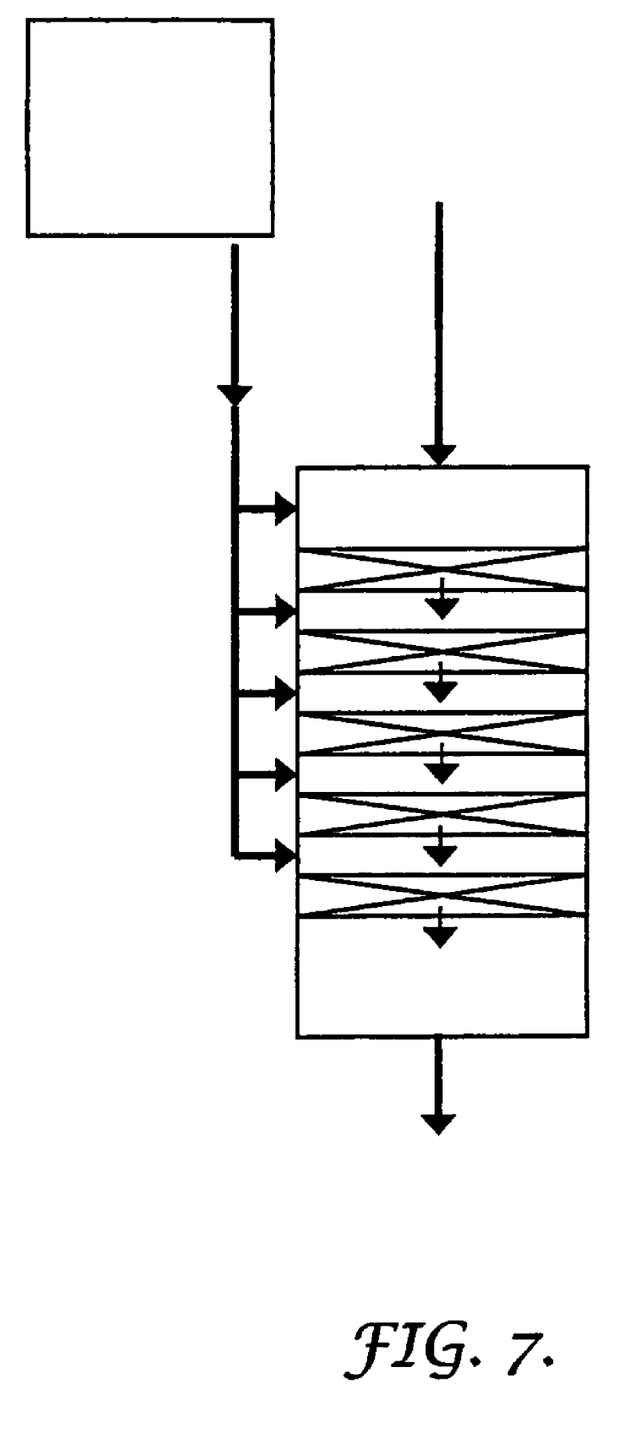
FIG. 7 is a schematic of an embodiment of the current invention with five regions of shift catalyst.

More catalyst regions may be added and the regions may be made smaller and smaller as depicted in FIG. 7, where, in the limit, there is continuous introduction of gaseous feed streams along the length of the shift reactor. Although the catalyst regions are depicted to be spatially separated and distinct, they may be adjacent with no space between them. Existence of more than one catalyst region is established by the existence of at least one downstream gaseous feed stream.

Figure 8:
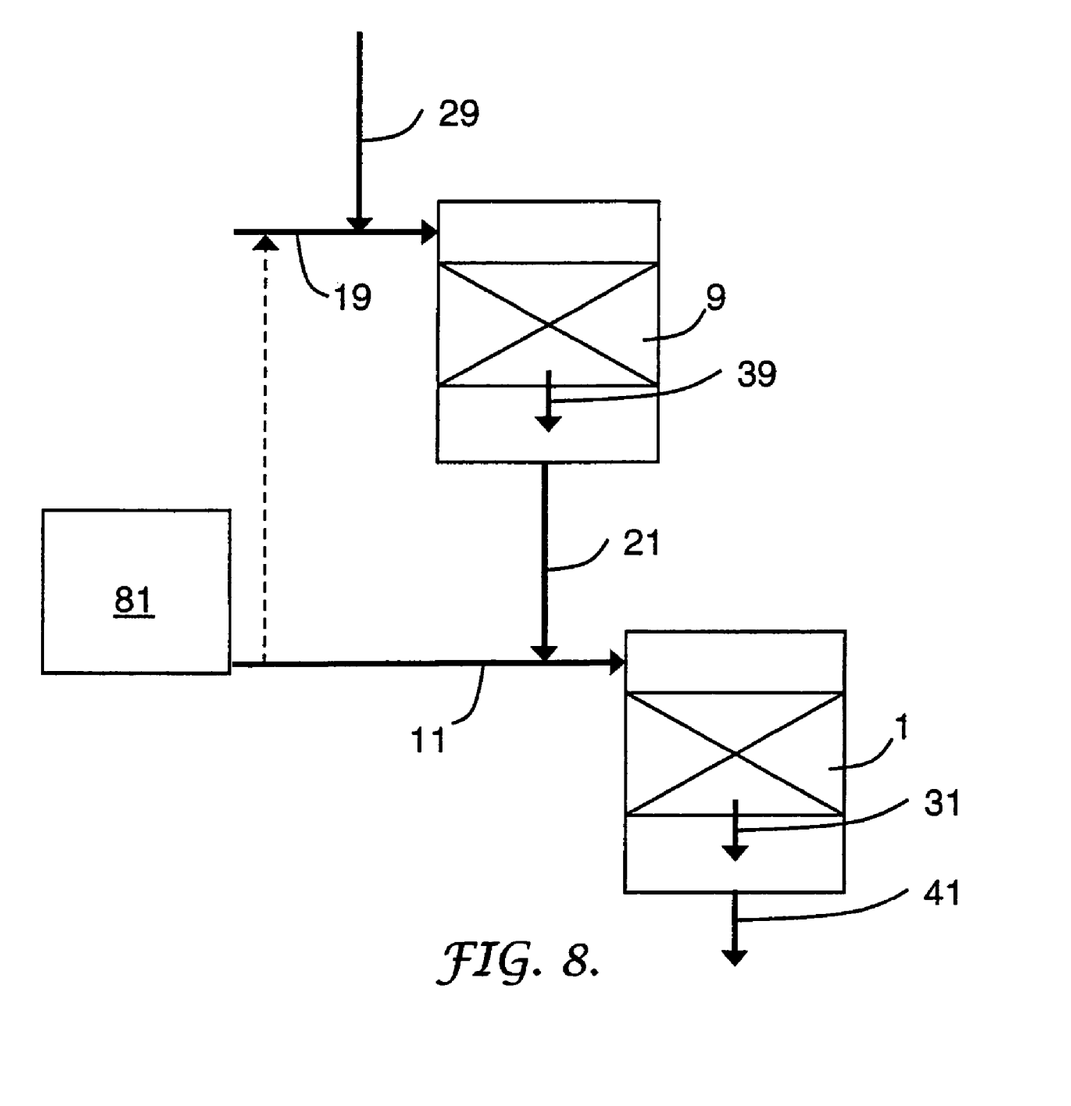
FIG. 8 is a schematic of an embodiment of the current invention with a region of shift catalyst and a region of selective oxidation catalyst.

FIG. 8 shows another embodiment of the invention. A high temperature shift catalyst region 1 is provided. A first gaseous stream 11 comprising syngas from catalytic steam reformer 81 is introduced to the first shift catalyst region 1. The catalytic steam reformer 81 may be operated with a steam-to-carbon ratio of 1.7 to 2.8, or 2.2 to 2.7. A first oxidative stream 21 comprising $CO_2$ is mixed with the first gaseous stream 11 prior to introducing to the first shift catalyst region 1. In this figure, the first gaseous stream 11 and the first oxidative stream 21 are shown to be introduced indirectly, i.e. after mixing, but the streams may be introduced directly. In this embodiment, the first oxidative stream is derived from effluent from a selective oxidation reactor. A second gaseous stream 19 comprising CO and a second oxidative stream 29 comprising $O_2$ are introduced to a selective oxidation catalyst region 9 where additional $CO_2$ is formed, thereby forming a selective oxidation reactor effluent stream 39, which is used as the first oxidative stream 21. In the first shift catalyst region 1, CO and $H_2O$ are reacted in the presence of the shift catalyst to produce additional $H_2$ and $CO_2$, thereby forming a first region product stream 31. The first region product stream 31 is removed from the shift reactor as product stream 41.

The high temperature shift catalysts that may be employed include the iron oxide/chromia compositions normally employed for the shift reaction and may contain a small proportion of copper. An example of a suitable high temperature shift catalyst is described in U.S. Pat. No. 5,656,566. Suitable catalysts may have an iron oxide content (expressed as $Fe_2O_3$) of 60 to 95% by weight. The iron to chromium atomic ratio in the precursor may be in the range 6 to 20, or 8 to 12. The precursor may contain oxides of other metals, e.g. aluminum, manganese, or, as mentioned above, copper. Precursors may have an iron to copper atomic ratio of 10:1 to 100:1. Such additional oxides may be introduced by coprecipitation of suitable metal compounds that decompose upon heating to the oxides with the iron and chromium compounds. Alternatively, or additionally, such additional oxides may be incorporated by effecting the precipitation of the iron and chromium compounds in the presence of the desired additional oxides or compounds that decompose to the oxides upon heating. Alternatively, such oxides, or compounds that decompose thereto upon heating, may be added to the precipitated iron and chromium compounds before calcination and shaping into the desired pellets. Alternatively, the precipitated iron and chromium compounds, before or after calcination and forming the shaped pellets, may be impregnated with a solution of compounds that decompose upon heating to the desired additional oxides.

The catalyst may be in the form of a random packed bed of pellets of the support, which may be a macroporous foam as described in U.S. Pat. No. 4,810,685, or monolithic, e.g. a honeycomb or a macroporous foam as aforesaid, to which the catalytic material has been applied, for example by impregnation or coating.

If, as is usual, the high temperature shift reaction over the iron-containing catalyst is effected adiabatically, the temperature and carbon monoxide content of the gas leaving the high temperature shift reaction will depend on the composition of the shift inlet gas and how closely the shift equilibrium is approached. However the carbon monoxide content of the gas leaving the high temperature shift reaction is typically in the range 2-5% by volume (on a dry basis) and the outlet temperature will generally be in the range 350-500° C. If desired, in combination with any of the embodiments, the shifted gas may be cooled and subjected to low temperature shift, e.g. at an outlet temperature in the range 200-280° C., using conventional low temperature shift catalysts. The combination of high temperature shift followed by low temperature shift is well known in the art.

Figure 9:
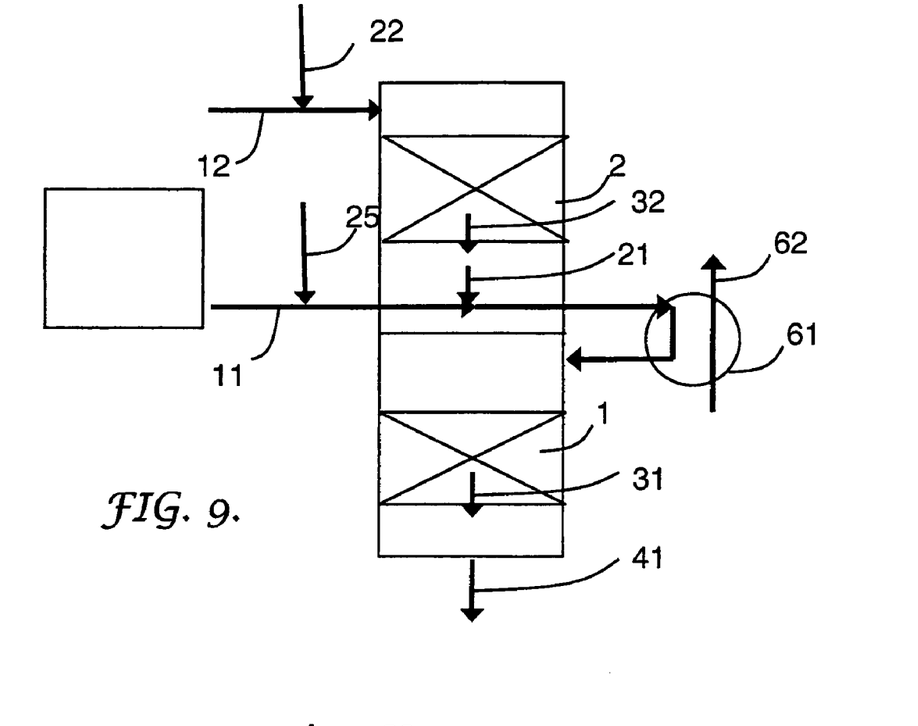
FIG. 9 is a schematic of an embodiment of the current invention with interregion cooling.

Further, the current invention may include cooling schemes in combination with any of the embodiments discussed in FIGS. 1-8. FIG. 9 shows an external heat exchanger 61 for inter-stage cooling. In this illustration, streams 11, 21 and 25 are mixed prior to cooling against cooling stream 62 in heat exchanger 61 before being introduced to first shift catalyst region 1. Cooling stream 62 may be any suitable cooling stream with a temperature less than the combined stream of 11, 21, and 25. Stream 62 may also be one and the same as streams 11 or 12, i.e. an economizer. Streams 11 and 25 could alternatively be introduced downstream of the interstage cooler such that stream 21 is the only stream passed through the heat exchanger 61. The heat exchanger 61 does not need to be external to the shift catalyst vessel as shown in FIG. 9, but may be inside of the unit as an internal heat exchanger. Second gaseous stream 12 and second oxidative stream 22 may be introduced indirectly to the second catalyst region 2, as shown in the figure, or directly. In the second shift catalyst region 2, CO and $H_2O$ are reacted in the presence of the shift catalyst to produce additional $H_2$ and $CO_2$, thereby forming a second region product stream 32, which is used as the first oxidative stream 21. In the first shift catalyst region 1, CO and $H_2O$ are reacted in the presence of the shift catalyst to produce additional $H_2$ and $CO_2$, thereby forming a first region product stream 31. The first region product stream 31 is removed from the shift reactor as product stream 41.

Figure 10:
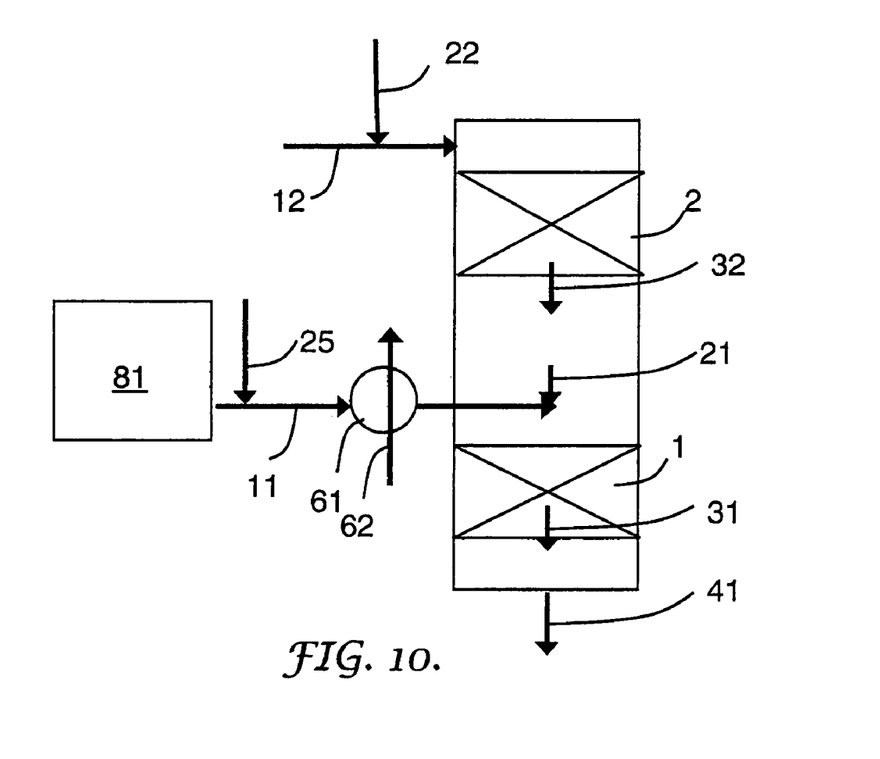
FIG. 10 is a schematic of an embodiment of the current invention with cooling of a downstream combined feed stream and oxidative stream.

Cooling may also be provided to gaseous streams comprising CO, and optionally $H_2O$, $H_2$, and $CO_2$ and oxidative streams introduced downstream without cooling intermediate catalyst region streams as shown in FIG. 10. In FIG. 10, gaseous stream 11 from catalytic steam reformer 81 and oxidative stream 25 are combined and then cooled against cooling stream 62 in heat exchanger 61. Alternatively, only one of streams 11 and 25 can be cooled. Second gaseous stream 12 and second oxidative stream 22 may be introduced indirectly to the second catalyst region 2, as shown in the figure, or directly. In the second shift catalyst region 2, CO and $H_2O$ are reacted in the presence of the shift catalyst to produce additional $H_2$ and $CO_2$, thereby forming a second region product stream 32, which is used as the first oxidative stream 21. In the first shift catalyst region 1, CO and $H_2O$ are reacted in the presence of the shift catalyst to produce additional $H_2$ and $CO_2$, thereby forming a first region product stream 31. The first region product stream 31 is removed from the shift reactor as product stream 41.

Figure 11:
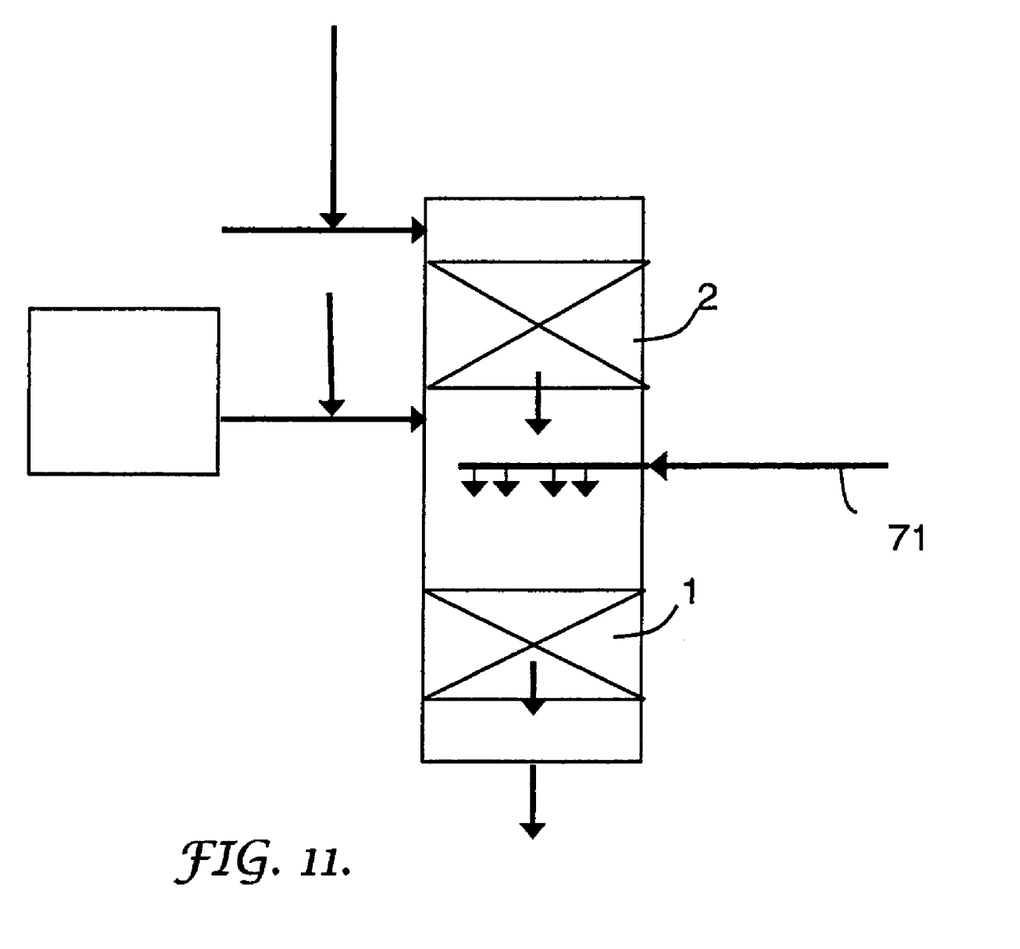
FIG. 11 is a schematic of an embodiment of the current invention with water injection between catalyst regions.

Cooling may be affected by spraying water between the first and second region of shift catalyst. FIG. 11 shows a water containing stream 71 introduced between first region of shift catalyst 1 and second region of shift catalyst 2.

The inventive method may be practiced and constructed by means well known in the art.

EXAMPLES

The invention is further illustrated by way of the following examples, which are not meant in any way to limit the scope of the invention. Examples are by way of computer simulation, a technique accepted in the art. The simulation considers a catalytic steam reformer and shift reactor in combination.

Generally, the $CO/CO_2$ ratio is used in these examples for the primary criterion for over-reduction. For the purpose of example, a $CO/CO_2$ ratio less than or equal to 1.61 will be considered acceptable to prevent over-reduction of the catalyst. Since steam injection does not affect the $CO/CO_2$ ratio, this criterion is not relevant for steam injection. The secondary criterion used, when the primary condition is not met, is the steam-to-dry-gas ratio equal or greater than 0.6. When the primary criterion is satisfied, the secondary criterion is considered irrelevant.

Example 1

Base Case

The base case has one catalyst region, similar to FIG. 1, but without the oxidative stream 21. The base case serves as a basis for comparison for efficiency improvement and over-reduction. For the base case, the reformer feed stream has a steam to carbon (steam-to-carbon) ratio of 3. The reformer effluent, which is the gaseous feed stream 11 to the shift reactor has a $CO/CO_2$ ratio of 1.61 and a steam-to-dry-gas ratio of 0.54. The thermal efficiency of H2 production will be normalized with the thermal efficiency of the base case, giving a value of 1 for the base case.

With a feed to the reformer having a steam to carbon ratio of 3, the primary criterion to prevent over-reduction of catalyst, $CO/CO_2 \leq 1.61$, is satisfied.

Example 2

Reduced Steam and No Oxidative Stream

There is incentive to reduce the amount of steam to the catalytic steam reformer. This improves the overall efficiency of the process.

Example 2 has one catalyst region, similar to FIG. 1, but without the oxidative stream 21. The reformer feed stream has a reduced steam to carbon ratio of 2.5. In this case the reformer effluent, which is the gaseous feed stream 11 to the shift reactor has a $CO/CO_2$ ratio of 1.86 and a steam-to-dry-gas ratio of 0.46. The normalized thermal efficiency is calculated to be 1.015, a 1.5% improvement over the base case, thereby illustrating the incentive to reduce the steam-to-carbon ratio to the reformer.

But in this case, neither criterion for preventing over-reduction of the catalyst is satisfied. The $CO/CO_2$ ratio is 1.86, which is greater than the maximum 1.61, and the steam-to-dry-gas ratio is 0.46, which is less than the minimum 0.6.

Example 3

Oxidative Stream from Shift Reactor Product Stream

Example 3 has one catalyst region, similar to FIG. 1, with the oxidative stream 21. The reformer feed stream has a reduced steam to carbon ratio of 2.5. In this case the reformer effluent, which is the gaseous feed stream 11, is blended with an oxidative stream 21, which in this example is a slipstream of the product stream 41 from the shift reactor, after being cooled considerably, but still above the dew point, to facilitate recycle compression. The molar ratio of stream 21 to stream 11 is 0.085. The blended stream to the shift reactor then has a $CO/CO_2$ ratio of 1.61. The normalized thermal efficiency is calculated to be 1.014, a 1.4% improvement over the base case.

In this example, the primary criterion for preventing over-reduction of the catalyst is satisfied. A similar thermal efficiency improvement to example 2 is provided while keeping the catalyst in a safe regime.

Example 4

Oxidative Stream from Pure $CO_2$

Example 4 has one catalyst region, as in FIG. 1, with the oxidative stream 21. The reformer feed stream has a reduced steam to carbon ratio of 2.5. In this case the reformer effluent, which is the gaseous feed stream 11, is blended with an oxidative stream 21, which in this example is pure $CO_2$. The molar ratio of stream 21 to stream 11 is 0.008. The blended stream to the shift reactor then has a $CO/CO_2$ ratio of 1.61. The normalized thermal efficiency is calculated to be 1.014, a 1.4% improvement over the base case.

In this example, the primary criterion for preventing over-reduction of the catalyst is satisfied and a thermal efficiency similar to example 2 is provided.

Example 5

Oxidative Stream from Hydrogen Pressure Swing Adsorption Purge Gas

Example 5 has one catalyst region, as in FIG. 1, with the oxidative stream 21. The reformer feed stream has a reduced steam to carbon ratio of 2.5. In this case the reformer effluent, which is the gaseous feed stream 11, is blended with an oxidative stream 21, which in this example is purge gas from a hydrogen pressure swing adsorber having a composition of 45% $CO_2$, 22% $CH_4$, 20% of $H_2$, 12% CO, and other minor components such as $H_2O$ and $N_2$. The molar ratio of stream 21 to stream 11 is 0.022. The blended stream to the shift reactor then has a $CO/CO_2$ ratio of 1.61. The normalized thermal efficiency is calculated to be 1.016, a 1.6% improvement over the base case.

In this example, the primary criterion for preventing over-reduction of the catalyst is satisfied and a thermal efficiency similar to example 2 is provided.

Example 6

Oxidative Stream from Hydrogen Pressure Swing Adsorption Feed Gas

Example 6 has one catalyst region, as in FIG. 1, with the oxidative stream 21. The reformer feed stream has a reduced steam to carbon ratio of 2.5. In this case the reformer effluent, which is the gaseous feed stream 11, is blended with an oxidative stream 21, which in this example is feed gas from a hydrogen pressure swing adsorber having a composition of 72% $H_2$, 15% $CO_2$, 8% $CH_4$, 4% CO, and other minor components such as $H_2O$ and $N_2$. The molar ratio of stream 21 to stream 11 is 0.065. The blended stream to the shift reactor then has a $CO/CO_2$ ratio of 1.61. The normalized thermal efficiency is calculated to be 1.013, a 1.3% improvement over the base case.

In this example, the primary criterion for preventing over-reduction of the catalyst is satisfied and a thermal efficiency similar to example 2 is provided.

Example 7

Two Region Shift Reactor with Oxidative Stream from Shift Reactor Product Stream Example 7 has two catalyst regions, as in FIG. 5, with oxidative stream 22. The reformer feed stream has a reduced steam to carbon ratio of 2.5. In this case the reformer effluent, which is the second gaseous feed stream 12, is blended with an oxidative stream 22, which in this example is a portion of the shift reactor product stream 41 having a composition of 54% $H_2$, 25% $H_2O$, 11% $CO_2$, 6% $CH_4$, 3% CO, and other minor components such as $N_2$. First gaseous feed stream 11 is also reformer effluent, having the same composition as second gaseous feed stream 12. The molar ratio of stream 22 to stream 12 is 0.082. Gaseous feed stream 12 is much smaller than gaseous feed stream 11. The molar ratio of stream 12 to stream 11 is 0.076. The blended stream to the second catalyst region of the shift reactor then has a $CO/CO_2$ ratio of 1.61 and a steam-to-dry-gas ratio of 0.45. The blended stream to the first catalyst region of the shift reactor from the combination of streams 32 and 11 has a $CO/CO_2$ ratio of 1.61 and a steam-to-dry-gas ratio of 0.45. The normalized thermal efficiency is calculated to be 1.014, a 1.4% improvement over the base case.

In this example, the primary criterion for preventing over-reduction of the catalyst in both catalyst regions is satisfied and a thermal efficiency similar to example 2 is provided.

It should be noted that the amount of oxidative stream is significantly reduced for this two catalyst region process compared to the single region process of example 3. The molar ratio of stream 22 to combined streams 11 and 12 is 0.0058 compared to the molar ratio of 0.085 for the single region process of example 3. The oxidative stream flow rate for the two catalyst region process is only about 7% of the oxidative stream flow rate for the single catalyst region process of example 3.

Example 8

Two Region Shift Reactor with Oxidative Stream from Pure $CO_2$

Example 8 has two catalyst regions, as in FIG. 5, with oxidative stream 22. The reformer feed stream has a reduced steam to carbon ratio of 2.5. In this case the reformer effluent, which is the second gaseous feed stream 12, is blended with an oxidative stream 22, which in this example is a stream of pure $CO_2$. First gaseous feed stream 11 is also reformer effluent, having the same composition as gaseous feed stream 12. The molar ratio of stream 22 to stream 12 is 0.008. Gaseous feed stream 12 is much smaller than gaseous feed stream 11. The molar ratio of stream 12 to stream 11 is 0.077. The blended stream to the second catalyst region of the shift reactor then has a $CO/CO_2$ ratio of 1.61 and a steam-to-dry-gas ratio of 0.45. The blended stream to the first catalyst region of the shift reactor from the combination of streams 32 and 11 has a $CO/CO_2$ ratio of 1.61 and a steam-to-dry-gas ratio of 0.45. The normalized thermal efficiency is calculated to be 1.014, a 1.4% improvement over the base case.

In this example, the primary criterion for preventing over-reduction of the catalyst in both catalyst regions is satisfied and a thermal efficiency similar to example 2 is provided.

It should be noted that the amount of oxidative stream is significantly reduced for this two catalyst region process compared to the single region process of example 4.

Example 9

Two Region Shift Reactor with Oxidative Stream from Hydrogen Pressure Swing Adsorption Purge Gas Example 9 has two catalyst regions, as in FIG. 5, with oxidative stream 22. The reformer feed stream has a reduced steam to carbon ratio of 2.5. In this case the reformer effluent, which is the second gaseous feed stream 12, is blended with an oxidative stream 22, which in this example is a stream derived from a hydrogen pressure swing adsorption purge gas having a composition similar to that in Example 5. First gaseous feed stream 11 is also reformer effluent, having the same composition as gaseous feed stream 12. The molar ratio of stream 22 to stream 12 is 0.022. Gaseous feed stream 12 is much smaller than gaseous feed stream 11. The molar ratio of stream 12 to stream 11 is 0.078. The blended stream to the second catalyst region of the shift reactor then has a $CO/CO_2$ ratio of 1.61 and a steam-to-dry-gas ratio of 0.44. The blended stream to the first catalyst region of the shift reactor from the combination of streams 32 and 11 has a $CO/CO_2$ ratio of 1.61 and a steam-to-dry-gas ratio of 0.44. The normalized thermal efficiency is calculated to be 1.015, a 1.5% improvement over the base case.

In this example, the primary criterion for preventing over-reduction of the catalyst in both catalyst regions is satisfied and a thermal efficiency similar to example 2 is provided.

It should be noted that the amount of oxidative stream is significantly reduced for this two catalyst region process compared to the single region process of example 5.

Example 10

Two Region Shift Reactor with Oxidative Stream from Hydrogen Pressure Swing Adsorption Feed Gas Example 10 has two catalyst regions, as in FIG. 5, with oxidative stream 22. The reformer feed stream has a reduced steam to carbon ratio of 2.5. In this case the reformer effluent, which is the second gaseous feed stream 12, is blended with an oxidative stream 22, which in this example is a stream derived from a hydrogen pressure swing adsorption feed gas having a composition similar to that in Example 6. First gaseous feed stream 11 is also reformer effluent, having the same composition as gaseous feed stream 12. The molar ratio of stream 22 to stream 12 is 0.062. Gaseous feed stream 12 is much smaller than gaseous feed stream 11. The molar ratio of stream 12 to stream 11 is 0.077. The blended stream to the second catalyst region of the shift reactor then has a $CO/CO_2$ ratio of 1.61 and a steam-to-dry-gas ratio of 0.42. The blended stream to the first catalyst region of the shift reactor from the combination of streams 32 and 11 has a $CO/CO_2$ ratio of 1.61 and a steam-to-dry-gas ratio of 0.44. The normalized thermal efficiency is calculated to be 1.014, a 1.4% improvement over the base case.

In this example, the primary criterion for preventing over-reduction of the catalyst in both catalyst regions is satisfied and a thermal efficiency similar to example 2 is provided.

It should be noted that the amount of oxidative stream is significantly reduced for this two catalyst region process compared to the single region process of example 6.

Example 11

Two Region Shift Reactor with Oxidative Stream from Steam

Example 11 has two catalyst regions, as in FIG. 5, with oxidative stream 22. The reformer feed stream has a reduced steam to carbon ratio of 2.5. In this case the reformer effluent, which is the second gaseous feed stream 12, is blended with an oxidative stream 22, which in this example is a stream of steam. First gaseous feed stream 11 is also reformer effluent, having the same composition as gaseous feed stream 12. The molar ratio of stream 22 to stream 12 is 0.098. Gaseous feed stream 12 is much smaller than gaseous feed stream 11. The molar ratio of stream 12 to stream 11 is 0.078. The blended stream to the second catalyst region of the shift reactor then has a $CO/CO_2$ ratio of 1.86 and a steam-to-dry-gas ratio of 0.60. The blended stream to the first catalyst region of the shift reactor from the combination of streams 32 and 11 has a $CO/CO_2$ ratio of 1.61 and a steam-to-dry-gas ratio of 0.65. The normalized thermal efficiency is calculated to be 1.013, a 1.3% improvement over the base case.

In this example, the primary criterion for preventing over-reduction of the catalyst in the first catalyst region is not satisfied. However, the secondary criterion of steam-to-dry-gas ratio greater than or equal to 0.6 is satisfied. In the second catalyst region, the primary criterion for preventing over-reduction of the catalyst is satisfied. A thermal efficiency similar to example 2 is provided.

It should be noted that the amount of steam for the oxidative stream is significantly reduced for this two catalyst region process compared to the single region process using steam as the oxidative stream.

Although illustrated and described herein with reference to specific embodiments and examples, the present invention nevertheless is not intended to be limited to the details shown. Rather, various modifications may be made in the details within the scope and range of equivalents of the claims without departing from the spirit of the invention.

What is claimed is:

1. A method for producing hydrogen rich gas comprising:
producing synthesis gas in a catalytic steam reformer wherein the catalytic steam reformer has a reformer feed with a steam-to-carbon molar ratio of 1.7 to 2.8;
withdrawing an effluent stream comprising the synthesis gas from said catalytic steam reformer wherein the effluent stream from said catalytic steam reformer has a $CO$-to-$CO_2$ molar ratio greater than 1.61;
directly or indirectly introducing a first gaseous stream comprising at least a portion of the effluent stream from said catalytic steam reformer into a first shift catalyst region;
directly or indirectly introducing a first oxidative stream comprising $CO_2$ into said first shift catalyst region wherein said first oxidative stream is derived at least in part from at least one of a side stream from the first shift catalyst region, a product stream from the first shift catalyst region after cooling in a heat exchanger, an effluent stream from a second shift catalyst region, an enriched $CO_2$ stream from a $CO_2$ separation unit, an effluent stream from a combustion process, a selective oxidation reactor effluent stream, a hydrogen pressure swing adsorption purge gas stream, a hydrogen pressure swing adsorption feed gas stream, a $CO_2$-rich stream from a hydrogen plant, a $CO_2$-rich stream from a refinery, a $CO_2$-rich stream from a chemical plant, and a $CO_2$-rich stream from a nearby process;
reacting $CO$ and $H_2O$ in said first shift catalyst region to produce additional $H_2$ and $CO_2$ thereby forming a product stream; and
withdrawing the product stream from the first shift catalyst region;
wherein the effluent stream from the second shift catalyst region is formed by:
directly or indirectly introducing a second gaseous stream comprising $CO$ and optionally $H_2O$ into the second shift catalyst region;
directly or indirectly introducing a second oxidative stream comprising at least one of $H_2O$ and $CO_2$ into said second shift catalyst region; and
reacting $CO$ and $H_2O$ in the second shift catalyst region to produce additional $H_2$ and $CO_2$ thereby forming said effluent stream from the second shift catalyst region.

2. The method of claim 1 wherein the second shift catalyst region contains an iron oxide-based catalyst and
wherein said first oxidative stream is derived at least in part from said effluent stream from the second shift catalyst region.

3. The method of claim 1 wherein the second shift catalyst region contains a low temperature shift catalyst or a medium temperature shift catalyst.

4. The method of claim 1 further comprising the steps of:
directly or indirectly introducing a second gaseous stream comprising CO into a selective oxidation catalyst region;
directly or indirectly introducing an oxidative stream comprising $O_2$ into the selective oxidation catalyst region;
reacting CO in the selective oxidation catalyst region to produce additional $CO_2$ hereby forming a selective oxidation catalyst region effluent stream wherein said selective oxidation reactor effluent stream is derived at least in part from said selective oxidation catalyst region effluent stream.

5. The method of claim 2 wherein the second gaseous stream is produced at least in part by the catalytic steam reformer.

6. A method for producing hydrogen rich gas comprising:
producing synthesis gas in a catalytic steam reformer wherein the catalytic steam reformer has a reformer feed with a steam-to-carbon molar ratio of 1.7 to 2.8;
withdrawing an effluent stream comprising the synthesis gas from said catalytic steam reformer wherein said effluent stream from said catalytic steam reformer has a CO-to-$CO_2$ molar ratio greater than 1.61;
directly or indirectly introducing a first gaseous stream comprising at least a portion of the effluent stream from said catalytic steam reformer into a first shift catalyst region;
directly or indirectly introducing a second gaseous stream comprising CO and $H_2O$ into a second region of shift catalyst;
directly or indirectly introducing an oxidative stream comprising at least one of $H_2O$ and $CO_2$ to said second region of shift catalyst;
reacting CO and $H_2O$ in said second region of shift catalyst to produce additional $H_2$ and $CO_2$ thereby forming a second region product stream;
directly or indirectly introducing at least a portion of said second region product stream into the first region of shift catalyst;
reacting CO and $H_2O$ in said first region of shift catalyst to produce additional $H_2$ and $CO_2$ thereby forming a first region product stream; and
withdrawing the first region product stream from the first region of shift catalyst.

7. The method of claim 6 wherein the oxidative stream is provided at least in part from at least one of the first region product stream, the second region product stream, and a third region product stream.

8. The method of claim 6 further comprising the step of:
withdrawing a side stream wherein said oxidative stream is derived at least in part from said side stream.

9. The method of claim 6 wherein the oxidative stream is derived at least in part from an enriched $CO_2$ stream from a $CO_2$ separation unit.

10. The method of claim 6 wherein the oxidative stream is derived at least in part from a hydrogen pressure swing adsorption purge gas stream.

11. The method of claim 6 wherein the oxidative stream is derived at least in part from a hydrogen pressure swing adsorption feed gas stream.

12. The method of claim 6 wherein the second gaseous stream is produced at least in part by the catalytic steam reformer or a second catalytic steam reformer.

13. An apparatus for producing hydrogen rich gas comprising:
a first shift catalyst region having an inlet;
a first gaseous stream source comprising a catalytic steam reformer for providing a first gaseous stream comprising CO and $H_2O$, said first gaseous stream source in fluid communication with the inlet of said first shift catalyst region; and
a selective oxidation catalyst region having an outlet, wherein the selective oxidation catalyst region outlet is in fluid communication with the inlet of said first shift catalyst region.

14. The apparatus of claim 13 wherein the first shift catalyst region comprises a high temperature shift catalyst.

15. An apparatus for producing hydrogen rich gas comprising:
a first shift catalyst region having an inlet;
a first gaseous stream source comprising a catalytic steam reformer for providing a first gaseous stream comprising CO and $H_2O$, said first gaseous stream source in fluid communication with the inlet of said first shift catalyst region;
a second shift catalyst region having an outlet, wherein the second shift catalyst region outlet is in fluid communication with the inlet of said first shift catalyst region;
a second gaseous steam source for providing a second gaseous stream comprising CO and optionally $H_2O$, said second gaseous stream source in fluid communication with an inlet of said second shift catalyst region; and
an oxidative steam source for providing a oxidative stream comprising at least one of $H_2O$ and $CO_2$, said oxidative stream source in fluid communication with the inlet of said second shift catalyst region.

16. The apparatus of claim 15 wherein the second gaseous stream source comprises the catalytic stream reformer.

17. The apparatus of claim 15 wherein the second shift catalyst region comprises a low temperature shift catalyst or a medium temperature shift catalyst.

18. The apparatus of claim 13 further comprising:
a second gaseous stream source for providing a second gaseous stream comprising CO, said second gaseous stream source in fluid communication with an inlet of said selective oxidation catalyst region; and
an oxidative stream source for providing an oxidative stream comprising $O_2$, said oxidative stream source in fluid communication with the inlet of said selective oxidation catalyst region.

* * * * *